United States Patent [19]

Ishigo

[11] Patent Number: 4,850,233
[45] Date of Patent: Jul. 25, 1989

[54] RECOIL APPARATUS

[75] Inventor: Naomoto Ishigo, Kodaira, Japan

[73] Assignee: Kioritz Corporation, Tokyo, Japan

[21] Appl. No.: 195,005

[22] Filed: May 17, 1988

[30] Foreign Application Priority Data

Jun. 5, 1987 [JP] Japan ............................ 62-141076

[51] Int. Cl.⁴ ............................ F03G 1/02; F02N 3/02
[52] U.S. Cl. .................................. 74/6; 123/179 SE;
123/185 A; 185/45; 267/156
[58] Field of Search .................. 185/37, 39, 45; 74/6;
33/138; 242/84.8; 123/179 SE, 185 A;
267/156, 275

[56] References Cited

U.S. PATENT DOCUMENTS

| | | | |
|---|---|---|---|
| 2,868,186 | 1/1959 | Schnacke | 123/185 |
| 2,956,795 | 10/1960 | Foster | 33/138 X |
| 2,979,417 | 4/1961 | Kruger et al. | 267/156 X |
| 2,990,827 | 7/1961 | Kawecki | 123/179 |
| 3,010,443 | 11/1961 | Lyvers | 123/179 |
| 3,167,308 | 1/1965 | Bernstein et al. | 267/156 |
| 3,439,428 | 4/1969 | Zelnick | 267/156 X |
| 4,365,690 | 12/1982 | Zavatkay et al. | 267/156 X |
| 4,732,121 | 3/1988 | Miyata et al. | 123/185 BA |

Primary Examiner—Allan D. Herrmann
Attorney, Agent, or Firm—Browdy & Neimark

[57] ABSTRACT

A recoil apparatus has a drum rotatably disposed within a casing. A peripheral groove is formed in the drum in such a manner as to open in the outer periphery of the drum. A recoil spring member is formed into a spiral shape and is received within the peripheral groove, with its inner end being secured to the drum and its outer end extending from the casing to the outside. A pulling knob is mounted on the outer end of the recoil spring member.

4 Claims, 2 Drawing Sheets

RECOIL APPARATUS

BACKGROUND OF THE INVENTION

1. Field of the Invention

The present invention relates to a recoil apparatus which may be used as a starting equipment for an internal combustion engine serving as a power source for a portable-type power motor, out board motor, or the like.

2. The Prior Art

As shown in FIG. 3, a conventionally-known, typical recoil apparatus has the following construction. A casing 1 opening at one end thereof receives a band-shaped spring 2 wound into a spiral shape. One end of the spring 2 is held by the casing 1 while both the side edges thereof are held by side plates 4 and 5, so that the spring 2 is held in its place in such a manner as to be kept from loosening within the casing 1. The casing 1 has a central boss portion 6 on which a drum 7 is rotatably mounted. The drum 7 is disposed on the outer side of one 5 of the side plates. The other end of the spring 2 is secured to the drum 7. The drum 7 is held in its place by a screw 8 threaded into the central boss portion 6 of the casing 1 and a washer 9 in such a manner as to be prevented from being disengaged from the boss portion 6 outwardly in the axial direction. A rope 11 is spirally wound within a deep peripheral groove 10 which is formed in the drum 7 and which opens in the outer periphery of the drum 7. The inner end of the rope 11 is fixed to the drum 7. An annular boss portion 12 of the drum 7 is provided with an engagement portion 13 which can be disengageably linked to a member, for instance the crankshaft, of an internal combustion engine, not shown.

In the conventional recoil apparatus having the above-described construction, it is necessary to provide the rope 11 which is pulled out to cause the rotation of the drum 7 and also the spring 2 which is used to cause the reverse rotation of the drum 7 when the rope 11 is to be returned to its wound-up state and which is provided exclusively for this purpose. This requirement makes it difficult to reduce the size of the entire apparatus and to assemble the apparatus with less labor and within a short period. Further, the construction of the conventional apparatus raises some problems including the problem that the assembly and disassembly of the apparatus are difficult. That is, for instance, when the rope 11 has become worn out or cut and therefore the drum 7 has to be taken out of the casing 1, if this operation is being performed carelessly, there is a risk that the end of the spring 2 that is secured to the drum 7 may become displaced outwardly in the axial direction and, in an instant, the spirally wound spring 2 may unwind by its resilience.

SUMMARY OF THE INVENTION

Accordingly, it is an object of the present invention to provide a recoil apparatus which is capable of eliminating the problems of the prior art and which has a simple construction and can be manufactured and assembled with ease.

According to the present invention, there is provided a recoil apparatus comprising: a casing; a drum rotatably disposed within the casing; a peripheral groove formed in the drum in such a manner as to open in the outer periphery of the drum; a recoil spring member formed into a spiral shape and received within the peripheral groove, the inner end of the recoil spring member being secured to the drum and the outer end of the recoil spring member extending from the casing to the outside; and a pulling knob mounted on the outer end of the recoil spring member.

With this construction of the recoil apparatus in accordance with the present invention, the recoil spring member is normally kept in a state in which it is wound up within the peripheral groove of the drum by its own resilient spring force. The recoil apparatus is operated when the operator pulls the pulling knob mounted on the outer end of the recoil spring member. The recoil spring member acts both as a spring for holding the recoil spring member in a wound-up state and as a rope for operating the recoil apparatus. Therefore, it is possible to reduce the number of components required and thus to reduce the size of the apparatus. The recoil spring member is normally kept in a condition in which it is received within the peripheral groove of the drum. Therefore, the assembly and disassembly of the apparatus can be performed easily and safely while avoiding the risk of the recoil spring member becoming unwound.

DESCRIPTION OF THE PREFERRED EMBODIMENT

The present invention will be described hereunder with respect to the illustrated embodiment thereof.

Figure 1:
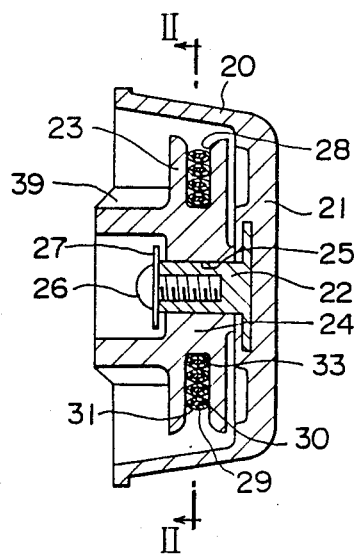
FIG. 1 is a longitudinal sectional view of the essential parts of a recoil apparatus in accordance with one embodiment of the present invention.
Figure 2:
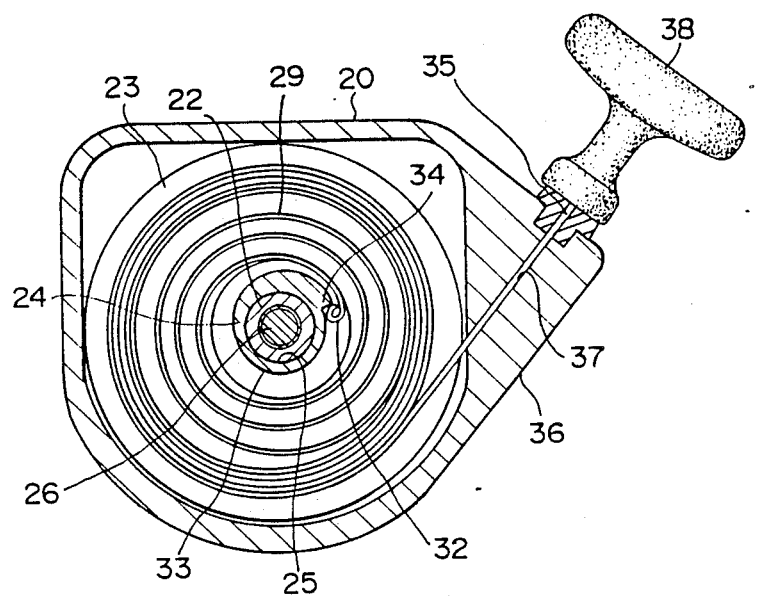
FIG. 2 is a sectional view taken along the line II—II shown in FIG. 1 and in the direction of arrows.

FIGS. 1 and 2 illustrate a recoil apparatus in accordance with one embodiment of the present invention. The recoil apparatus has a cup-shaped casing 20 which opens at one end thereof. The casing 20 has a bottom wall portion 21, and the central portion of the bottom portion 21 has a drum mounting boss portion 22 formed integrally therewith. The drum mounting boss portion 22 fits in a center hole 25 formed in a boss portion 24 of a drum 23, and the drum mounting boss portion 22 supports the drum 23 in such a manner that the drum 23 is rotatable relative to the casing 20. A screw 26 threaded from the tip of the drum mounting boss portion 22 and a washer 27 interposed between the screw 26 and the drum mounting boss portion 22 hold the drum 23 in its place in such a manner as to prevent the drum 23 from being disengaged from the drum mounting boss portion 22 outward in the axial direction.

The drum 23 is formed with a deep peripheral groove 28 opening in the outer periphery of the drum 23. A recoil spring member 29 formed into a spiral shape is received in the peripheral groove 28. The recoil spring member 29 comprises an elongated constant-load spring member 30 and a coating material 31 which is a synthetic resin having wear resistance and cushioning characteristics, for instance, vinyl, and which is coated on the surface of the spring member 30 in such a manner as to cover the surface. The constant-load spring member 30 preferably has a flat, band-shaped configuration, and the spring member 30 is adapted to be received within the peripheral groove 28 in a state in which it is spirally wound a multiplicity of times. The inner end 32 of the recoil spring member 29 is engaged with a projection 34 formed on the bottom surface 33 of the peripheral groove 28 of the drum 23. On the other hand, the outer end 35 of the recoil spring member 29 passes through a pulling guide hole 37 formed in a wall portion 36 of the casing 20 to extend to the outside of the apparatus. A pulling knob 38 is mounted on the outer end 35 of the recoil spring member 29. The recoil spring member 29 is normally kept in a state in which it is wound up around the bottom surface 33 of the peripheral groove 28 of the drum 23 and is thus received in the groove 28 by a resilient spring force of the constant-load spring member 30, one constituent of the member 29. The recoil spring member 29 is illustrated as it is in this state.

The outer peripheral surface of the boss portion 24 of the drum 23 has engagement pawls 39 formed integrally therewith. The engagement pawls 39 can be disengageably linked to a member, for instance, to a centrifugal engagement member which is in turn linked to the crankshaft of an internal combustion engine, not shown.

When it is necessary to operate the recoil apparatus having the above-described construction at the start of the internal combustion engine, the operator holds and pulls the pulling knob 38, thereby pulling a part of the recoil spring member 29 out of the pulling guide hole 37 of the casing 20 against the resilience of the recoil spring member 29. By this operation, the drum 23 starts rotating in the counterclockwise direction as viewed in FIG. 2. At this time, since the spring member 30 constituting the recoil spring member 29 has a constant load, the knob 38 can be pulled by a substantially constant pulling force. The rotation of the drum 23 is transmitted to the crankshaft and the like of the internal combustion engine via the engagement pawls 39 at the boss portion 24 of the drum 23 to cause rotation of the crankshaft, etc., and thereby to start the internal combustion engine.

Figure 3:
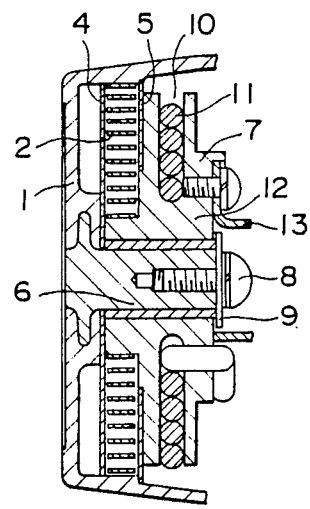
FIG. 3 is a longitudinal sectional view of the conventional recoil apparatus.

When the operator releases the knob 38, the pulled-out part of the recoil spring member 29 is wound again into the peripheral groove 28 by the spring force of the constant-load spring member 30, and the recoil spring member 29 thus returns to its wound-up state. It would be understood from the foregoing description that the recoil spring member 29 of the recoil apparatus of the present invention acts as both the spiral spring 2 and the rope 11 of the conventional recoil apparatus illustrated in FIG. 3. It would also be understood that the recoil spring member 29 stays within the peripheral groove 28 of the drum 23 while it is kept in its wound-up state even when the drum 23 is taken out of the casing 20 during the assembly or disassembly of the recoil apparatus.

I claim:

1. A recoil apparatus comprising: a casing; a drum rotatably disposed within said casing and disengageably linked to a crankshaft of an internal combustion engine; a peripheral groove formed in said drum in such a manner as to open in the outer periphery of said drum; a recoil spring member formed into a spiral shape and received within said peripheral groove, the inner end of said recoil spring member being secured to said drum and the outer end of said recoil spring member extending from said casing to the outside; and a pulling knob mounted on said outer end of said recoil spring member.

2. A recoil apparatus according to claim 1, wherein said recoil spring member has a constant-load characteristic.

3. A recoil apparatus according to claim 1, wherein said recoil spring member has a cross-sectional configuration which is that of a flat, band-shaped plate.

4. A recoil apparatus according to claim 1, wherein said recoil spring member is coated with a coating material of a synthetic resin.

* * * * *